April 26, 1960   E. J. HERBENAR   2,934,350
VEHICLE WHEEL SUSPENSION WITH BALL JOINTS
Filed July 1, 1957

Inventor
Edward J. Herbenar
by Hill, Sherman, Meroni, Gross & Simpson
Attys

United States Patent Office 2,934,350
Patented Apr. 26, 1960

2,934,350

VEHICLE WHEEL SUSPENSION WITH BALL JOINTS

Edward J. Herbenar, Detroit, Mich., assignor to Thompson Ramo Wooldridge Inc., a corporation of Ohio Application July 1, 1957, Serial No. 669,079

2 Claims. (Cl. 280—96.2)

The present invention relates to vehicle suspension systems and is, more particularly, concerned with the provision of a simplified arrangement for the suspension of independently mounted front vehicle wheels.

As those skilled in the art of vehicle suspension are aware, the most common type of independent front wheel suspension now employed in automotive vehicles comprises a pair of generally parallel control arms pivotally connected to the vehicle frame at vertically spaced points and secured at their outer ends to upper and lower ends of a vehicle steering knuckle. The inner ends of the control arm are pivoted about axes that are substantially parallel to the longitudinal axis of the vehicle so that the steering knuckle is permitted to move up and down as a substantially vertical link in a parallelogram linkage. In the prior suspension systems with which I am familiar the pivots for the inner ends of the control arms comprise plain or threaded bushings. Such bushings are satisfactory where substantially exact alignment of the bearings is achieved relative to the control arms and the vehicle frame. Unfortunately, however, in automotive mass production practices problems of exact alignment becomes extremely difficult and require special provisions for adjustment where non-self-aligning bearings are employed. Such special provisions are, of course, expensive and are further objectionable in that they complicate assembly procedures during the manufacturing of the vehicle.

The present invention is concerned with the provision of a wheel suspension structure wherein the vehicle control arms are simply mounted in a manner providing substantially complete self-alignment eliminating the need for complicated adjustable pivot bearings. In accordance with the present invention each control arm is constructed generally in the form of a triangle one point of which is secured to the wheel steering knuckle and the other two points of which are pivotally secured to the vehicle frame. The points of pivotal securement are, in accordance with the present invention, universal joints. Although it will be obvious to those skilled in the art that the two-point pivotal support for the individual control arm requires the control arm to pivot about a single axis determined by the two pivot points, and hence the control arm itself does not pivot in any universal fashion, nevertheless by providing a universal joint pivot any misalignment between the separate control arm legs or in the connection of the support to the vehicle frame is compensated for. Further, the pivot axis of the control arm is determined by the center points of the universal joints which can under no circumstances be out of line with each other as is possible with a pair of spaced cylindrical bearings. As a result of the construction employed in accordance with the present invention, a very simple and hence inexpensive suspension is provided for automotive vehicles.

It is, accordingly, an object of the present invention to provide a simplified independent front vehicle wheel suspension.

Another object of the present invention is to provide a control arm suspension employing a pair of universal pivots spaced longitudinally of the vehicle axis for pivotally supporting the control arm.

Yet a further object of the present invention is to provide a self-aligning pivotal support for a control arm in a vehicle suspension or the like.

A feature of the invention resides in the utilization of universal pivot joints at the inner ends of vehicle front wheel suspension control arms, whereby the pivot axis of the control arm is defined by a pair of points rather than a pair of separate general longitudinal pivot bearing axes.

Another feature of the invention resides in the utilization of a generally triangular control arm pivotally connected at one corner to a steering knuckle and universally pivotally connected at the other two corners to a vehicle frame for pivotal motion relative thereto.

Still other and further objects and features of the present invention will at once become apparent to those skilled in the art from a consideration of the attached sheet of drawings wherein a preferred embodiment of the invention is shown by way of illustration only, and wherein.

As shown on the drawings.

Figure 1:
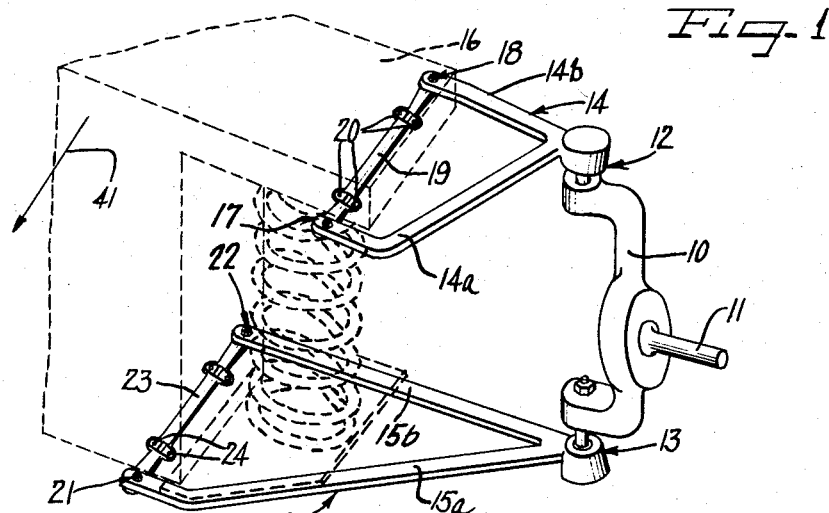
Figure 1 is a diagrammatic illustration of the suspension of the present invention.
Figure 2:
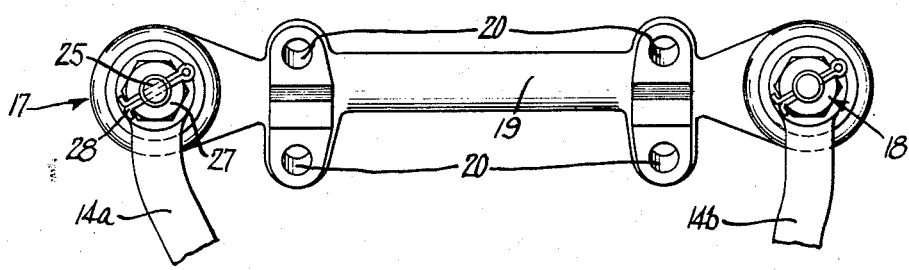
Figure 2 is an enlarged fragmentary view, in plan, of the connection between the control arm legs and the pivot bearing frame support.

As may be seen from a consideration of Figure 1, the suspension of the present invention comprises a vehicle steering knuckle 10 having rigidly associated therewith a wheel spindle 11 for the rotary support of a conventional front vehicle wheel. The steering knuckle 10 is provided with an upper ball joint connection generally indicated at 12 and a lower ball joint connection generally indicated at 13 for respective universal pivotal attachment to upper and lower control arms generally indicated at 14 and 15. These are mounted for pivotal movement relative to the vehicle frame, illustrated in dotted lines at 16 as will be more specifically described below.

The individual control arms 14 and 15 are each generally triangular in configuration. Thus, the control arm 14 comprises a pair of legs 14a and 14b secured at their outer ends at the joint 12 and secured at their inner ends by joint connections 17, 18 respectively to a support shaft or bar 19 which is in turn secured to the frame 16 by means of bolts secured through bolt apertures 20. The exact bolt connection at the frame 16 is not critical insofar as the present invention is concerned although it is, for rigidity's sake, preferred that at least four bolt apertures 20 be provided for the shaft 19.

The lower control arm 15 is substantially the same in construction as the upper control arm 14, except it is somewhat longer in most conventional suspension systems to provide for positioning a conventional spring between the lower control arm and the frame in the manner shown, for example, in United States patent to Booth No. 2,521,335 and as shown in dotted lines in Figure 1. Thus, the legs 15, 15a and 15b are secured at joints 21 and 22 to the lower inner shaft 23 which is in turn rigidly bolted to the frame 16 by means of bolt apertures 24. The longitudinal axes of the shafts 19 and 23 may be parallel but need not be in view of the universal joints 12 and 13 which permit some misalignment of the pivot axes of the control arm.

Figure 3:
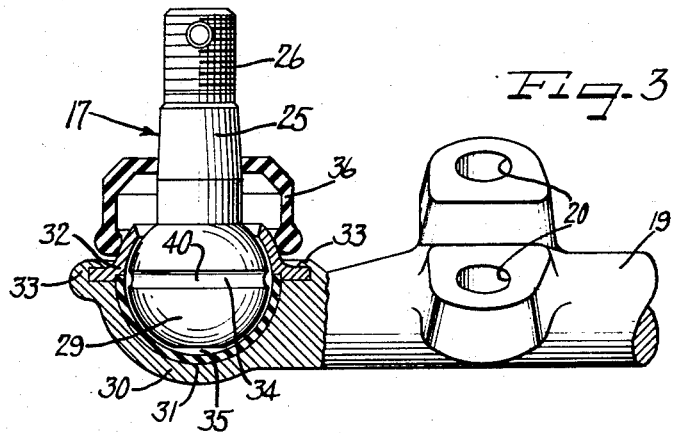
Figure 3 is an enlarged fragmentary view, in partial cross-section and in elevation of the universal pivot member employed in the form of the invention illustrated.

The joint connections 17, 18, 21 and 22 are substantially identical and are exemplified in the joint 17 ilillustrated in Figure 3. As there shown, a stud 25 is provided for securement to the leg 14a by means of the threads 26, nut 27 and cotter key 28. The stud 25 is provided with a segmental spherical stud head 29 which is seated in a segmental spherical socket 30 having an anti-friction liner 31 preferably constructed of a self-lubricating plastic such as for example high molecular weight polyamide or polyethylene, or a low friction laminated phenolic resin. The stud head 29 is retained relative to the socket 30 by means of collar 32 which in turn is fixed relative to the socket 30 by means of a spun over lip 33. Th stud head 29 is provided with a lubricant reservoir groove 34 which, in combination with the small reservoir 35 and the self-lubricating nature of the plastic liner 31 provides lifetime lubrication of the pivot joint. A seal 36 is provided for preventing the ingress of dirt into the joint.

It will be seen that the stud 25 will pivot about the universal point 40, and accordingly, that the leg 14a will pivot about the point 40. It is apparent, therefore, that each of the legs 14a, 14b and 15a, 15b will pivot about a point only rather than about a line and in view of the triangular relationship of each of the control arms, each arm will pivot about two substantially longitudinally spaced points. As a result of this arrangement no problem of bearing alignment whatever is provided and pivotal motion of the control arm is provided without any possibility whatever of binding. As illustrated the longitudinal axes of the shafts 19 and 23 are approximately parallel to each other and to the longitudinal horizontal axis 41 of the vehicle. Thus the frame 16, steering knuckle 10 and arms 14 and 15 provide substantially a parallelogram linkage which causes the spindle 11 to move up and down in a substantially vertical line.

It will be apparent to those skilled in the art that variations and modifications may be made relative to the specific structure herein illustrated without departing from the scope of the novel concepts of the present invention. Accordingly, it is my intention that the scope of the present invention be limited solely by that of the hereinafter appended claims.

I claim as my invention:

1. In combination in a suspension system for vehicles, a frame, upper and lower generally parallel triangular control arms pivotally connected at their outer ends to upper and lower ends of a steering knuckle, each said arm comprising a pair of legs joined at their outer ends, means individually universally pivotally supporting the inner ends of the legs to the vehicle frame at points spaced axially of said frame, said means comprising sockets integrally formed in a rigid bar rigidly secured to said frame generally lengthwise of the vehicle axis, a ball stud on each leg secured in a respective socket for oscillation therein, each said socket having an opening facing generally vertically and each said stud having a shank extending generally vertically through a respective socket aperture for attachment to a respective leg, and spring means connected between said frame and said steering knuckle acting to maintain said arms in a generally horizontal position to support said frame on said knuckle.

2. In combination in a suspension system for vehicles, a frame, upper and lower generally parallel triangular control arms pivotally connected at their outer ends to upper and lower ends of a steering knuckle, each said arm comprising a pair of legs joined at their outer ends, means individually universally pivotally supporting the inner ends of the legs to the vehicle frame at points spaced axially of said frame, said means comprising a pair of segmental spherical sockets integrally formed in a rigid bar rigidly secured to said frame generally lengthwise of the vehicle axis, a self-lubricating anti-friction lining material of segmental spherical configuration supported in each said socket, a ball stud on each leg secured in a respective socket in a substantially vertical position extending upwardly for attachment to its respective leg at a point vertically above the socket, and spring means connected between said frame and said steering knuckle acting to maintain said arms in a generally horizontal position to support said frame on said knuckle.

References Cited in the file of this patent

UNITED STATES PATENTS

| | | |
|---|---|---|
| 2,098,874 | Leighton | Nov. 9, 1937 |
| 2,290,923 | Wahlberg | July 28, 1942 |
| 2,305,795 | Schieferstein | Dec. 22, 1942 |
| 2,737,398 | Mohr | Mar. 6, 1956 |
| 2,779,603 | McRae | Jan. 29, 1957 |

FOREIGN PATENTS

| | | |
|---|---|---|
| 715,410 | Great Britain | Sept. 15, 1954 |
| 768,859 | Great Britain | Feb. 20, 1957 |